United States Patent [19]

Hirsch et al.

[11] Patent Number: 5,019,014

[45] Date of Patent: May 28, 1991

[54] FOREIGN OBJECT PROTECTION DEVICE FOR A HARVESTING MACHINE

[75] Inventors: Walter Hirsch, Bettendorf, Iowa; Herbert Becker, Zweibrucken, Fed. Rep. of Germany

[73] Assignee: Deere & Company, Moline, Ill.

[21] Appl. No.: 484,721

[22] Filed: Feb. 22, 1990

[30] Foreign Application Priority Data

Feb. 25, 1989 [DE] Fed. Rep. of Germany ....... 3905968

[51] Int. Cl.$^5$ .............................................. A01F 12/16
[52] U.S. Cl. .................................................. 460/106
[58] Field of Search ............................... 460/105, 106; 56/DIG. 24, 1, 17.4, 320.1, 320.2

[56] References Cited

U.S. PATENT DOCUMENTS 3,576,188  4/1971  Tanis .
4,440,179  4/1984  Bassett et al. .
4,446,875  5/1984  Deleu ................................. 460/106
4,657,029  4/1987  Helm et al. ......................... 460/106

FOREIGN PATENT DOCUMENTS 2037659  4/1971  Fed. Rep. of Germany .

Primary Examiner—Thuy M. Bui

[57] ABSTRACT

A harvesting machine is provided with a foreign material protective device to extract stones, sand and other material from the harvesting goods which are gathered by the header. With the present invention, the protective device is provided with a housing defined by two longitudinal walls, perpendicular to the flow of crop material, and two side walls, parallel to the flow of crop material. The longitudinal walls of the housing diverge slightly towards the outlet opening of the housing. The outlet opening is closed by a door having an impeller which extends into the housing when the door is closed. The impeller ejects material from the housing through the outlet opening when the door is opened.

14 Claims, 1 Drawing Sheet

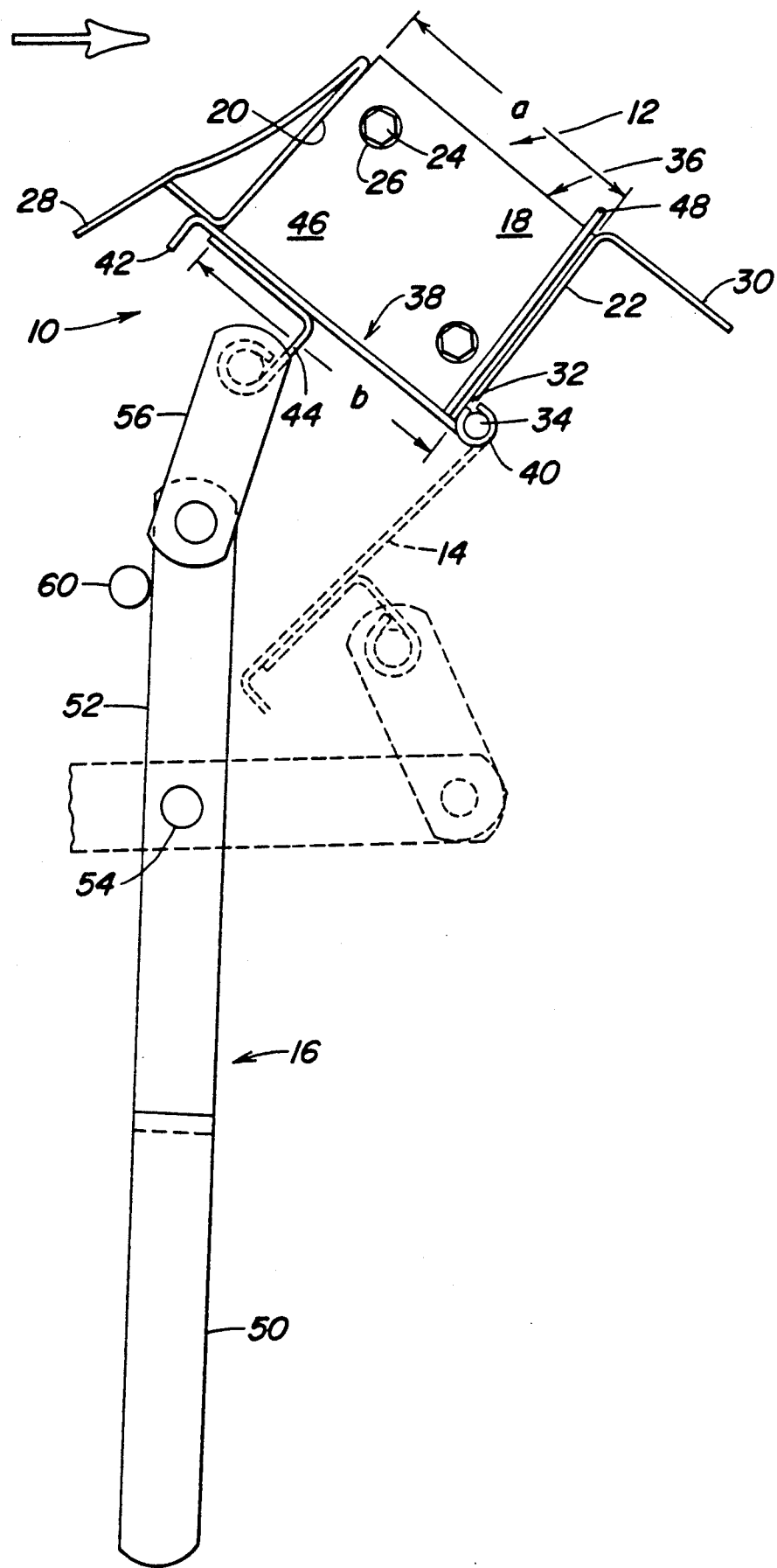

FOREIGN OBJECT PROTECTION DEVICE FOR A HARVESTING MACHINE

BACKGROUND OF THE INVENTION

1. Field of the Invention

The invention is directed to a protection device for a harvesting machine having a housing to accept the foreign objects. The housing is provided with a door. The housing includes side and longitudinal walls and an outlet opening, which can be opened or closed by the door.

2. Description of the Prior Art

Foreign object protection devices, sometimes referred to as stone traps, are usually found in the transition region between the feeder house and the threshing cylinder of a combine. Their function is to separate stones, metal particles, clumps of earth, etc. from the stream of the crop, so that they do not cause any damage in the combine. The stone trap is emptied at regular intervals, by opening the door, so that the foreign objects may be removed. Not only large pieces collect there, but also sand, crop residues, weeds, etc. so that a compact mass of very diverse materials accumulates in the housing. These materials are consolidated into a single clump due to the vibrations of the harvesting machine and they adhere to the walls of the stone trap. To remove this compacted mass, a tool must be used to break it up, which represents a loss of time and requires strenuous and difficult work, since the stone trap is arranged in a poorly accessible area. In addition, when emptying the stone trap, the operator can splattered with dirt.

A stone trap of the above-described type is disclosed in DE-OS 2 037 659. This stone trap is very difficult to unload since its outlet opening has a cross section that is smaller than that of its housing.

SUMMARY

It is an object of this invention to provide a foreign object protection device with a housing that can be reliably and easily emptied.

It is a further object of this invention of providing a means so that the compacted mass in the housing does not adhere to itself, and generally falls out without further assistance, s soon as the outlet is opened.

It is a feature of the present invention that when the door is opened, the mass is moved along by an impeller and expelled from the housing.

It is another feature of the present invention that the housing side walls are arranged in diverging directions. Accordingly, the housing is shaped as a truncated pyramid with unequal sides. With this shape, the mass accumulated in the housing does not adhere to the sidewalls.

If the impeller or impellers extend over the entire outlet opening, or at least over its width, the maximum possible mass is thrown out, and no foreign objects remain at the edge of the outlet opening that would prevent a later closing of the door.

In addition, the housing is completely evacuated if the impeller or impellers approach the longitudinal walls as closely as possible, leaving no intervening space for the accumulation of foreign objects that could occur while the door is closed.

It is advantageous if the impeller has a height equal to that of one of the sides, since it then does not project into the flow of the material.

Instead of a single reinforced sheet metal plate, the impeller, could be composed of individual teeth that compose a rake.

For the most adverse conditions, it is advantageous if the door can be swung together with the impeller by means of a lever that can apply sufficient force and which should be located in an easily accessible position.

The use of an over-center linkage between the lever and the door will provide a sufficient force to close the door against the housing that will retain it in this position without additional latches or the like.

BRIEF DESCRIPTION OF THE DRAWINGS

The drawing shows an embodiment of the invention described in greater detail in the following. The single figure shows a side view and a cross section of a foreign object protection device.

DETAILED DESCRIPTION

In a harvesting machine, not shown, such as a combine, a foreign object protection device 10 includes a housing 12, door 14 and a lever 16.

The housing 12 is composed of two side walls 18 and two longitudinal walls 20 and 22, each located opposite the other. The side and longitudinal walls 18, 20 and 22 are connected to each other at their end regions, by means not shown. They may be welded or formed from a single sheet metal piece.

The side walls 18 are secured by screws 24 to a side wall of the combine, not shown. The side walls 18 are preferably provided with holes 26, which engage the heads of the screws 24. Thus, the housing 12 is not forced against the side wall and clamped there by screws, but only retained there. Instead cf the screw heads, pins could be provided. If the side walls experience relative motion while the harvesting machine is moving across the field, the housing 12 will not experience any bending loads, since it can move with respect to the side walls.

The longitudinal wall 20 is located upstream and includes a leg 28 along which the underside of the feeder house conveyor (not shown) is located, and over which the crop is moved in the direction of the indicated arrow.

The longitudinal wall 22 is situated downstream and also includes a leg 30 that ends in a space between a threshing cylinder (not shown) and a conveyor chute (also not shown). At its lower edge, the downstream longitudinal wall 22 is provided with an eye 32 in which a hinge pin 34 is inserted.

The interior 46 formed by the side and longitudinal walls 18, 20, 22 is therefore open at top and bottom, constituting inlet and outlet openings 36 and 38. As can be seen in the drawing, the inner surfaces of the longitudinal walls 20, 22 are not parallel to each other, but diverge from the inlet opening 36 to the outlet opening 38. This is made clear in the drawing by two dimensions, "a" at the inlet opening 36 and "b" at the outlet opening 38, where "a" is smaller than "b". Similarly, the side walls 18 may diverge in the direction of the outlet opening 38, although this is not shown. The angle by which the inner surfaces of the side or longitudinal walls diverge from the parallel is so proportioned that an adhesion of the mass accumulating in the housing 12 is no longer possible under normal conditions.

The door 14 comprises a sheet metal plate with eyes 40 at its rear edge, located at the right in the drawing, which are connected to the hinge pin 34. The door 14 is also provided with a flanged edge 42 at its forward region to increase its bending stiffness and with a retainer 44 in its central region. The width of the door 14 is greater than the width of the outlet opening 38, and as such is greater than the dimension "b". Therefore, the door 14, when closed, has its inner surface in contact with the lower edges of the side and longitudinal walls 18, 20, 22, and closes the housing 12 in the region of its outlet opening 38. When the door 14 is in the position shown in solid lines, the housing 12 is closed. If it takes the position shown in dashed lines, rotated downward about the hinge pin 34, the housing is open at the bottom.

On the surface of the door 14 toward the interior 46, an impeller 48 is attached, in such a way that it is brought into contact with the inner surface of the longitudinal wall 22 when the door 14 closes the outlet opening 38. In this embodiment, the impeller 48 is configured as a sheet metal plate, reinforced with beads and/or flanges and welded to the door 14 nearly vertically. The height of the impeller 48 corresponds generally to the dimension "b". If the door 14 is rotated about the hinge pin 34, the edge of the impeller 48 that is most distant from the door 14 describes an approximate circular arc that extends almost to the inner surface of the longitudinal wall 20.

As mentioned initially, the impeller 48 may also be composed of a large number of impeller elements configured as teeth to form a rake-like structure.

The lever 16 comprises a first leg 50 configured as a handgrip and a second leg 52, and is pivoted between the legs 50, 52 from a pin 54 located below the door 14.

The second leg 52 pivotally engages a bracket 56. The other end of the bracket 56, pivotally engages the retainer 44.

Accordingly, the second leg 52 comprises a linkage with the bracket 56, which goes through a dead center at which is assumes its greatest total length between its two end positions, as shown in solid and dashed lines.

As shown, in solid lines in the drawing, in the door closed position, the lever 16 assumes a position in which the retainer 44, the bracket 56, the first and the second leg 50, 52 and the pin 54 are located in nearly a single line. The door 14 is forced against the lower edges of the side and longitudinal walls 18, 20, 22. The second leg 52 is prevented from further counterclockwise rotation by stop 60.

If the lever is swung in clockwise direction, the linkage consisting of the second leg 52 and the bracket 56 initially reaches a dead center position, in which the door 14 is forced against its seat even harder. After it passes this position, the bracket 56 moves towards the second leg 52. Thereupon, the bracket 56 moves the door 14 by means of the retainer 44 and rotates it downward in counterclockwise direction. Then, the door 14, the bracket 56 and the lever 16 assume the unloading position, shown in dashed lines in the drawing.

If the crop or the like is moved by means of conveyor arrangements (not shown) in the direction of the indicated arrow across the open inlet 36 between the two longitudinal walls 20, 22, foreign objects and similar loose material in the flow of the crop have a chance to fall into the space between the side and longitudinal walls 18, 20, 22 and to remain there. As soon as the housing 12 is filled with foreign objects, the lever 16 is swung in clockwise direction, as described above, and thereby rotates the door 14 from a closed position to an open position. By virtue of the shape of the interior 46 of the housing 12, the mass of foreign objects, sand, weeds and harvest residue cannot adhere to the side and longitudinal walls 18, 20, 22 and falls downward out of the housing 12. If the door 14 is equipped with an impeller 48, as is the case in this embodiment, the impeller 48 is moved through the interior 46 when the door 14 is forcibly opened and ejects the mass contained therein.

Only in this embodiment is the impeller 48 provided in addition to the tapered shape of the interior 46. Under normal conditions; either one of these aids in unloading would be sufficient to empty the housing 12.

We claim:

1. A foreign object protection device for a harvesting machine comprising:

a housing for accepting foreign objects, the housing having two opposed planar longitudinal walls which are interconnected by two opposed sidewalls that define an inlet opening through which foreign objects enter the housing and an outlet opening through which foreign objects exit the housing;

a door having a closed position for closing the outlet opening of the housing and an open position for opening the outlet opening of the housing, whereby the planar longitudinal walls of the housing diverge outwardly from the inlet opening to the outlet opening.

2. A foreign object protection device for a harvesting machine comprising:

a housing for accepting foreign objects, the housing having side and longitudinal walls that define an inlet opening through which foreign objects enter the housing and an outlet opening through which foreign objects exit the housing;

a door having a closed position for closing the outlet opening of the housing and an open position for opening the outlet opening of the housing, whereby the longitudinal walls of the housing diverge outwardly from the inlet opening to the outlet opening, wherein the door is provided with an impeller which projects into the housing when the door is closed.

3. A foreign object protection device as defined by claim 2 wherein the sidewalls of the housing diverge outwardly from the inlet opening to the outlet opening.

4. A foreign object protection device as defined by claim 3 wherein the impeller extends the length of the longitudinal walls.

5. A foreign object protection device as defined by claim 4 wherein the impeller contacts one of the longitudinal walls when the door is closed.

6. A foreign object protection device as defined by claim 5 wherein the impeller is provided with individual impeller elements.

7. A foreign object protection device as defined by claim 6 wherein the door is provided with a lever for forcibly positioning the door in the closed or opened position.

8. A foreign object protection device as defined by claim 7 wherein the lever is provided with a bracket, the lever and bracket forming an overcenter linkage for opening and closing the door.

9. A foreign object protection device for a harvesting machine comprising:

a housing for accepting foreign objects, the housing having side and longitudinal walls that define an inlet opening through which foreign objects enter the housing and an outlet opening through which foreign objects exit the housing;

a door having a closed position for closing the outlet opening of the housing and an open position for opening the outlet opening of the housing, whereby the door is provided with an impeller which projects into the housing when the door is closed and forcibly ejects material located in the housing when the door is opened.

10. A foreign object protection device as defined by claim 9 wherein the impeller extends the length of the longitudinal walls.

11. A foreign object protection device as defined by claim 10 wherein the impeller contacts one of the longitudinal walls when the door is closed.

12. A foreign object protection device as defined by claim 11 wherein the impeller is provided with individual impeller elements.

13. A foreign object protection device as defined by claim 12 wherein the door is provided with a lever for forcibly positioning the door in the closed or opened position.

14. A foreign object protection device as define by claim 13 wherein the lever is provided with a bracket, the lever and bracket forming an overcenter linkage for opening and closing the door.

* * * * *